May 22, 1956     V. J. SHERROD     2,746,715
WIRE GUIDING DEVICE
Filed July 27, 1953
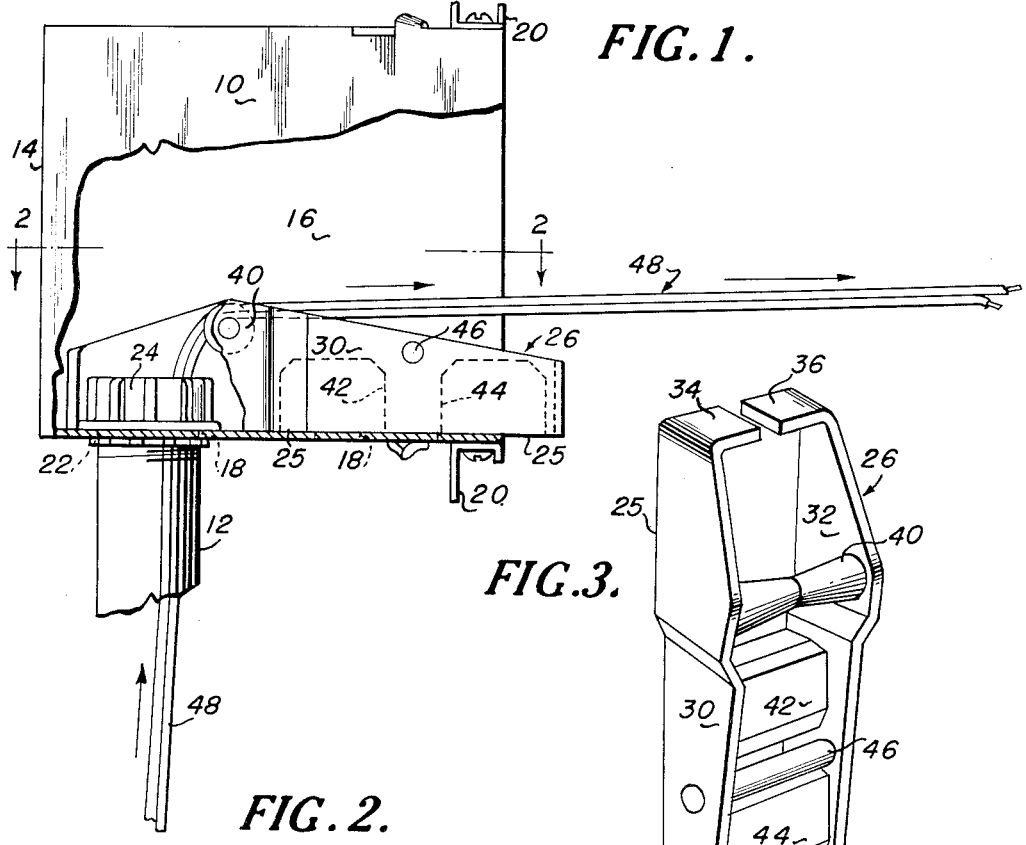
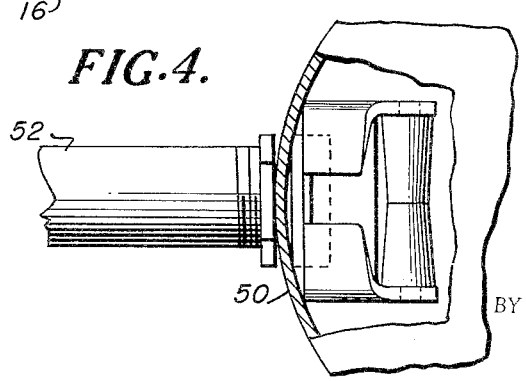
INVENTOR
Virgil J. Sherrod
BY
Cushman, Darby & Cushman
ATTORNEYS United States Patent Office 2,746,715
Patented May 22, 1956

2,746,715

WIRE GUIDING DEVICE

Virgil James Sherrod, Knoxville, Tenn.

Application July 27, 1953, Serial No. 370,549

4 Claims. (Cl. 254—134.3)

This invention relates generally to a device for guiding and installing wires, cables, insulated conductors and the like within conduit systems, and more particularly to a device or tool for installing insulated conductors within building electrical systems having conduits, outlet-boxes and wall housings.

More specifically, my invention relates to a wire guiding device for facilitating the installation of insulated conductors in an electric conduit or pipe system whereby a conductor may be easily inserted in, and fed or pulled through the conduit and outlet-box or wall housing. In addition, the device serves to protect the insulating material of the conductor from abrasive action which would tend to mar or expose the bare wire.

In accordance with present standard practices, an insulated conductor is usually fed through the conduit system with a "fishing tool" and subsequently drawn through the conduits and outlet-boxes by hand. The insulated cable is allowed to pass over sharp corners tending to cause binding of the wire or conductor and scraping or marring of the same, and eventually the loss of proper insulation. Frequently, when excessive force is required for pulling the conductor through the conduit system, actual elongation and reduction of wire size occurs, resulting in a conductor of smaller diameter and size which would have less current carrying capacity than required for the system.

With the above-mentioned and other disadvantages of prior practice in mind, it is therefore an object of my invention to provide a wire guiding device or tool to facilitate the insertion, feeding and pulling of a wire, cable or conductors through a conduit system.

Another object of my device is to provide a wire guiding device or tool which may be temporarily and detachably held in operative position adjacent an open end of a conduit within an outlet-box or wall housing so as to eliminate binding, scraping and marring of insulation as electrical conductors are passed or drawn through an outlet-box conduit system.

A further object of my invention is to provide a device of the type herein described of a portable character, convenient for handling and capable of being readily installed for use.

Another object of my invention is to provide a wire guiding device or tool of simple design having a minimum number of parts which is rugged, durable, and efficient in use and yet capable of inexpensive manufacture and assembly.

The accompanying drawing forming a part of my application illustrates a preferred embodiment of my invention associated with a conventional outlet-box conduit system, in which:

Fig. 1 is a side elevation partly in section illustrating my wire guiding device or tool in operative position within a conventional outlet-box.

Fig. 2 is a sectional view along the line 2—2 of Fig. 1.

Fig. 3 is a perspective view of the wire guiding device of my invention.

Fig. 4 is a sectional view showing the wire guiding device of my invention associated with a circular type of outlet-box construction.

My wire guide as shown in Fig. 1 and Fig. 2 is associated with an outlet-box conduit system including an outlet-box 10 and a conduit 12. The outlet-box or housing 10 includes a bottom portion 14 and side walls 16 having the usual openings 18 for selective use. Lug or ear elements 20 are provided adjacent the face or open side of the box for the purpose of mounting the same within a wall as will be readily understood by these skilled in the art.

A threaded conduit 12 extends into the body of the box 10 through one of the openings 18 and is secured in proper position by opposing nuts 22 and 24. Nut 24 covers the threaded end of the conduit 12 within the box and thus limits the length of the conduit extending within the same.

The present embodiment of my wire guiding device or tool is shown in operative position within an outlet-box 10 in Figs. 1 and 2 and in perspective in Fig. 3. Essentially, the device comprises a substantially rectangular frame 26 formed of metal bent into a U-shape and having a closed end 28 and side elements 30 and 32. The opposite end is partially closed by inwardly bent arms 34 and 36 terminating in a spaced apart relation so as to define an opening 38 for receiving wire, cable or conductors within the frame. Adjacent the wire receiving end of the device a guide roller 40 extends transversely of the frame 26 and is of a form tapering from its ends inwardly toward a central portion of reduced cross-section.

This roller 40 is formed of brass or some other non-magnetic material as a magnetized roller would attract small particles of metal into its bearing or bushing and thus would become inoperative.

A pair of spaced apart magnets 42 and 44 utilized to hold the device against materials influenced by a magnetic field of force, extend transversely of the frame near the closed end 28 of the frame 26 and are secured in any desirable manner. Also, and for obtaining additional strength of the device, I may utilize a transversely extending reinforcing member 46.

The wire guide of Figs. 1 and 2 is shown in operative position within an outlet-box 10 and lying flush against a side wall 16. In the embodiment herein presented, the face 25 of the wire guide frame 26 presents a planar surface for engagement with the side walls of the box 10. In the operative position of the guide, inwardly directed arms 34 and 36 of the side frame elements 28 and 30 embrace the nut 24 of the conduit and the magnets 42 and 44 draw the frame toward and securely hold the device against the side wall 16 of the box.

It will be apparent that the inwardly directed arms 34 and 36 will snugly embrace a conduit end and prevent excessive lateral movement of the guiding device when it is in use. In this position of the device the roller 40 is presented adjacent an edge of the conduit opening, and forms a guide over which conductors 48 may pass as they are drawn in either direction through the conduit system.

The magnetic holding and securing unit may assume any shape or number of magnets and may be retained within the frame in any desirable manner. While I have found the arrangement presented and comprising a pair of magnets 42 and 44 to be entirely satisfactory for holding the device in position within outlet-boxes or wall housings, other arrangements may be necessary in certain instances such as when the device is employed with conduit systems other than those of standard sizes.

In Fig. 4 my guiding device is shown employed with an outlet-box 50 of circular construction having the usual conduit 52 extending therein. It will be readily understood that the advantages of my guide remain when the same is employed with various other shapes of outlet-boxes and housings. Furthermore, the frame of the wire guide may be other than rectangular in shape, and the frame may present a convex surface for engagement with the walls of circular outlet-boxes and wall housings.

While I have shown and described herein one preferred form of my invention, it is understood that modification and variation may be made within the scope of the appended claims without departing from the spirit of the invention.

I claim:

1. A wire guiding device for installing conductors in building electrical systems having conduits, outlet-boxes and wall housings comprising a frame including means defining a wire receiving opening within the frame, conductor guiding means carried by said frame and magnetic means for readily and detachably securing and holding the device in operative position.

2. A wire guiding device for installing conductors in building electrical systems having conduits, outlet-boxes and wall housings comprising a substantially rectangular frame having a closed end and an opposite end provided with a wire receiving opening, roller type conductor guiding means carried by said frame adjacent said opening and magnetic means for readily detachably securing and holding the device in operative position.

3. In a wire guiding device for installing conductors in an outlet box conduit system having an outlet-box and a conduit end extending into an opening in the body of the box, a frame formed into a substantially U-shape including open and closed end portions and having inwardly directed arms at the open end terminating in opposed spaced-apart relation and providing an opening in the frame for receiving conductors, said arms defining means to embrace the conduit end and limit movement of said frame, conductor guide means carried by the frame and magnetic means carried by the device for readily and detachably securing and holding the same in position within electrical outlet-boxes and housings.

4. In a wire guiding device for installing conductors in an outlet-box conduit system having an outlet-box and a conduit end extending into an opening in the body of the box, a frame formed into a substantially U-shape including open and closed end portions and having inwardly directed arms at the open end terminating in opposed spaced-apart relation and providing an opening in the frame for receiving conductors, said arms defining means to embrace a conduit end and limit movement of said frame, roller type conductor guiding means carried by the frame adjacent the opening in said frame and magnetic means carried by the device for readily and detachably securing and holding the same in operative position within electrical outlet-boxes and housings.

References Cited in the file of this patent

UNITED STATES PATENTS

| | | |
|---|---|---|
| 2,221,903 | Abramson et al. | Nov. 19, 1940 |
| 2,321,415 | Peltz et al. | June 8, 1943 |
| 2,458,573 | Donahue | Jan. 11, 1949 |
| 2,515,724 | McCroskey | July 18, 1950 |
| 2,516,383 | Hays | July 25, 1950 |
| 2,599,047 | Clark | June 3, 1952 |

FOREIGN PATENTS

| | | |
|---|---|---|
| 758,343 | France | Nov. 3, 1933 |